No. 829,706. PATENTED AUG. 28, 1906.
J. FREEMAN.
BRAKE FOR VEHICLES.
APPLICATION FILED APR. 5, 1902.
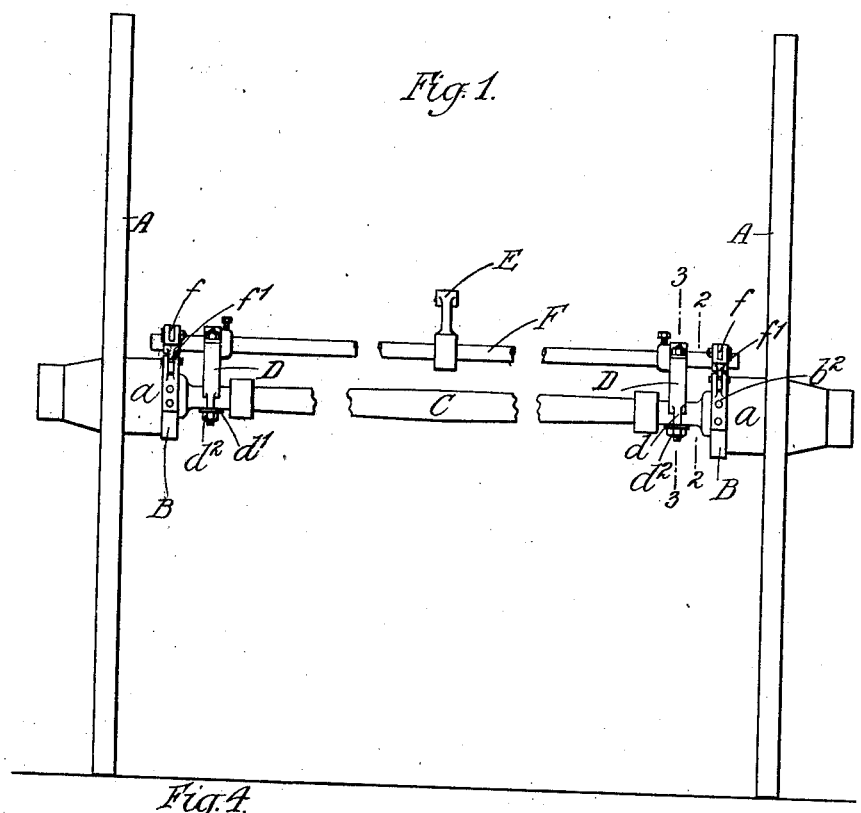
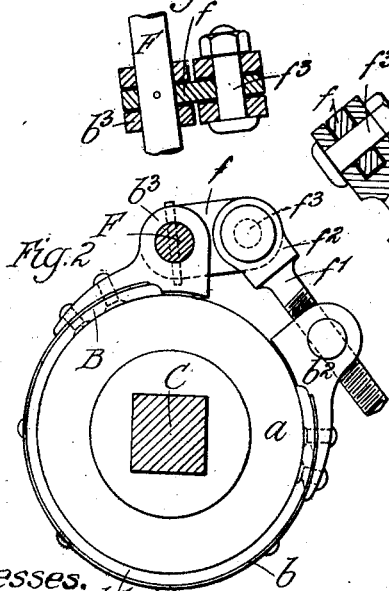
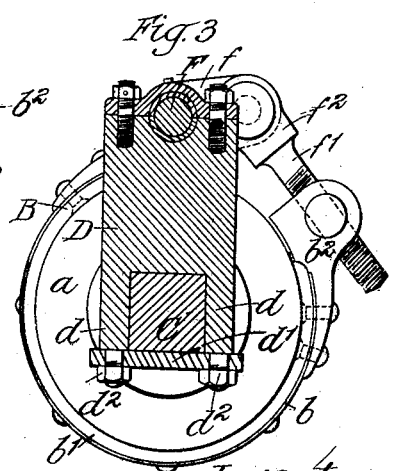
Witnesses.
P. F. Nagle.
L. Douville.
Inventor:
John Freeman,
By Wiedersheim & Fairbanks.
Attorneys.

UNITED STATES PATENT OFFICE.

JOHN FREEMAN, OF BRISTOL, ENGLAND.

BRAKE FOR VEHICLES.

No. 829,706.     Specification of Letters Patent.     Patented Aug. 28, 1906.

Application filed April 5, 1902. Serial No. 101,536.

*To all whom it may concern:*

Be it known that I, JOHN FREEMAN, florist, a subject of the King of Great Britain, residing at Hill House, Barton Hill, Bristol, in the county of Gloucester, England, have invented certain new and useful Improvements in and Relating to Brakes for Vehicles, of which the following is a specification.

This invention has reference to brakes for vehicles, and more particularly for two-wheeled road-vehicles, and has for its chief object so to construct and mount the brakes and their actuating mechanism that the action of said brakes is not affected by variations in the load of the vehicle and does not in the case of horse-drawn vehicles have the tendency to throw additional weight upon the back of the horse, as has heretofore ordinarily been the case.

Other objects of the invention are to compensate for the wear of the frictional surfaces of the brakes and to enable the wheels on both sides of the vehicle to be equally and simultaneously "braked," so that the vehicle shall not be caused to swerve from its course.

According to my said invention I mount the brakes and their operating mechanism upon appropriate supports or standards secured to the axletree of the wheels, thus insuring that the position of the brakes relatively to said wheels does not vary with the resilient rising and falling of the body of the vehicle, as has heretofore ordinarily been the case.

The brakes are actuated by means of a treadle or other appropriate device under the control of the driver or attendant through the intervention of a rocking shaft provided with appropriate mechanism for transmitting its motion to the aforesaid brakes.

In order that my invention may be clearly understood and readily carried into effect, I will now proceed to describe the same more fully with reference to the accompanying drawings, in which—

Figure 1 is a front view of a pair of wheels furnished with a brake constructed according to my invention. Figs. 2 to 5 are separate views, on a larger scale, of various parts of my improved brake and its actuating mechanism.

A A are the wheels, and B B the brakes, which in this instance are in the form of band-brakes. C is the axletree. D D are the aforesaid supports or standards fixed upon said axletree. E is a treadle, and F the rocking shaft upon which said treadle is mounted.

The hub $a$ of each of the wheels A A is adapted to be embraced by one of the brake-bands B B. One of the said bands is shown clearly in Fig. 2, (which is an enlarged section taken approximately on the line 2 2 of Fig. 1,) and preferably consists of a strip $b$ of flexible metal lined with a leather or other appropriate pad or cushion $b'$.

One of the standards D D is shown in Fig. 3, which is an enlarged section taken approximately on the line 3 3 of Fig. 1. The said standards are bifurcated at their lower ends and are arranged astride the axletree C, the lower ends of the prongs $d\ d$ of said standards being adapted to pass through a plate $d'$, which is secured in place by means of nuts $d^2\ d^2$.

The treadle E imparts angular motion to the shaft F, whose ends are mounted in appropriate bearings in the standards D D. Mounted fast upon said shaft are levers $f\ f$, which are connected, by means of links $f'\ f'$, to hollow internally-screw-threaded lugs or sockets $b^2\ b^2$ upon the free ends of the brake-bands B B. The fixed ends of said brake-bands are carried by lugs $b^3$, mounted loosely upon the shaft E.

One of the aforesaid links $f'\ f'$ is clearly shown in Figs. 2, 4, and 5 and comprises a bolt or pin, the head $f^2$ of which is pivotally connected to the lever $f$, the other end of said bolt or pin being screw-threaded and adapted to pass through and engage with the correspondingly-threaded lug $b^2$. By this method of connecting the brake-band to the lever $f$ I am enabled to adjust as desired the diameter of said band. This is effected by removing the bolt $f^3$, by which the said pin $f'$ is connected to the lever $f$, and rotating said pin so as to cause it to travel longitudinally in its screw-threaded lug to the required extent. In this manner I am enabled to readily compensate for wear of the frictional surfaces of the brake-bands, after which said bands can easily be again connected to the levers $f\ f$. Moreover, the relative diameters of the brake-bands can be adjusted so that the "braking" effect of said bands upon the respective wheels may be equal.

The brakes and their actuating mechanism are disposed in such manner relatively to the wheels that the free ends of the brake-bands are adapted to be pulled in a direction opposite to that of the revolution of the wheels.

A silencing material, such as india-rubber, may be interposed between the shaft F and its bearings for the purpose of preventing the "chattering" of the former owing to the vibration of the vehicle.

What I claim, and desire to secure by Letters Patent of the United States, is—

In a vehicle, an axle, a wheel at each end thereof, bifurcated supports resting directly on said axle at a squared portion thereof, a bar connecting said bifurcations with said axle, whereby said supports are adjustable thereon, a rock-shaft carried by said supports, a bar connected with said supports for holding said rock-shaft in position, brake-bands having one end thereof fastened to said rock-shaft and passing around the hubs of said wheels, a lug on the free end of said bands, a threaded pin engaging with each of said lugs on said brake-bands and pivotally connected with said rock-shaft, whereby the tension of said brake-bands may be adjusted.

In testimony whereof I have hereunto set my hand, in presence of two subscribing witnesses, this 25th day of March, 1902.

JOHN FREEMAN.

Witnesses:
   T. SELLY WARDLE,
   GEORGE ISAAC BRIDGES.